(12) United States Patent
Ma et al.

(10) Patent No.: US 6,433,117 B1
(45) Date of Patent: Aug. 13, 2002

(54) PHOSPHORYLATED POLYMER DISPERSANTS FOR INKS

(75) Inventors: Sheau-Hwa Ma, Chadds Ford, PA (US); Edward Francis McBride, Wilmington, DE (US)

(73) Assignee: E. I. du Pont de Nemours & Company, Wilmington, DE (US)

( * ) Notice: Subject to any disclaimer, the term of this patent is extended or adjusted under 35 U.S.C. 154(b) by 0 days.

(21) Appl. No.: 09/366,573

(22) Filed: Aug. 4, 1999

(51) Int. Cl.$^7$ ............................................... C08L 43/02
(52) U.S. Cl. ................. 526/277; 106/31.13; 106/31.25; 526/274; 526/320; 526/333
(58) Field of Search ................. 526/277, 274, 526/320, 333; 106/31.13, 31.25

(56) References Cited

U.S. PATENT DOCUMENTS

| | | | |
|---|---|---|---|
| 5,231,131 A | 7/1993 | Chu et al. | 524/504 |
| 5,708,066 A | 1/1998 | Otremba et al. | 524/127 |
| 5,708,095 A | 1/1998 | Page et al. | 52/301 |
| 5,746,816 A | * 5/1998 | Xu | 106/31.13 |
| 5,830,263 A | * 11/1998 | Hale | 106/31.27 |

FOREIGN PATENT DOCUMENTS

| | | |
|---|---|---|
| EP | 0 449 456 A1 | 10/1991 |
| EP | 0 458 245 A1 | 11/1991 |
| EP | 0 722 994 | 7/1996 |
| EP | 0 770 655 A2 | 5/1997 |
| WO | WO 93/11181 | 6/1993 |
| WO | WO 94/21701 | 9/1994 |
| WO | WO 96/06141 | 2/1996 |

\* cited by examiner

Primary Examiner—Fred Zitomer
(74) Attorney, Agent, or Firm—Bart E. Lerman

(57) ABSTRACT

The present invention relates to aqueous ink jet inks containing a copolymer dispersant comprising at least one polymerized monomer having the general formula:

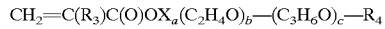

$$CH_2=C(R_3)C(O)OX_a(C_2H_4O)_b-(C_3H_6O)_c-R_4$$

where a=0 or 1; when a=1, X is an akyl, aryl, or alkaryl diradical connecting group of 1–9 carbon atoms; b and c are independently selected from the range of 0–100 provided that b and c are not simultaneously 0; $R_3$ is H or $CH_3$; and $R_4$ is preferably $PO_3H_2$.

15 Claims, No Drawings

PHOSPHORYLATED POLYMER DISPERSANTS FOR INKS

FIELD OF THE INVENTION

The present invention relates to monomers comprising a phosphate functionality, copolymers comprising these monomers and aqueous dispersions comprising such copolymers.

BACKGROUND OF THE INVENTION

Thermal ink jet printers vaporize ink in print heads by resistive heating. Vaporized ink is expelled through orifices toward substrates and any ink remaining in the print head is cooled before the next round of heating and vaporization. This process of vaporization and cooling, known as firing, usually occurs at high frequency in print heads drastically changing ink from water-rich to solvent-rich compositions around resistors. These changes may cause flocculation of insoluble particles, such as pigments. Additives such as polymer binders, thickeners, organic cosolvents and surfactants, in addition to the firing process described above, may further increase flocculation during printing. Flocculation of ink and plugged print heads are undesirable characteristics in the ink jet printer industry.

To avoid flocculation, dispersants added to inks increase the length of time insoluble particles remain in a dispersed state (i.e., increasing dispersion stability of an ink). However, the effectiveness of dispersants are dependent, in part, on the composition of inks and the environment under which inks are stored or used. Development of new polymer dispersants, which maintain particles in a dispersed state during various chemical and physical conditions are desirable characteristics.

One goal of ink jet printing technology is to spray ink onto a substrate, such as paper, and form discrete characters. It is well known that ink placed in contact with a substrate may ink bleed and/or color bleed. Ink bleed refers to the spreading out of ink on a substrate. Color bleed refers to ink mixing at ink boundaries between two or more ink droplets.

SUMMARY OF THE INVENTION

The present invention relates to copolymer dispersants having one or more phosphate functionality, which are able to maintain aqueous dispersions in dispersed states, in part, under differing pH conditions. Copolymers of the present invention are preferably used as dispersants and are prepared from ethylenically unsaturated monomers having a phosphate functionality that provides electrostatic interaction and a structure that provides steric interaction between insoluble particles in aqueous dispersions. These inventive copolymers may be used to produce aqueous dispersions having a distinct pH (in part, due to the pKas of the phosphate functionality) within a wide pH range. Inks of the present invention (including an inventive copolymer) may be used to reduce color bleed and increase print quality. A copolymer of the present invention is prepared using one or more ethylenically unsaturated monomers including a phosphate monomer having the general formula:

where a=0 or 1; when a=1, X is an akyl, aryl, or alkaryl diradical connecting group of 1–9 carbon atoms; b and c are independently selected from the range of 0–100 provided that b and c are not simultaneously 0; $R_3$ is H or $CH_3$; and $R_4$ is selected from the group consisting of $PO_3H_2$, alcohol and epoxy.

The present invention also provides aqueous dispersions, preferably an aqueous ink for use in ink jet printers, comprising an aqueous carrier, a colorant, and a copolymer dispersant comprising at least one polymerized phosphate monomer.

The present invention provides for articles comprising a substrate having a first and a second major surface and a layer, preferably a noncontiguous layer (e.g., one or more drops of ink), of aqueous dispersion attached to the substrate. The aqueous dispersion comprising a colorant and an inventive copolymer dispersant comprising at least one polymerized phosphate monomer.

As used herein, with respect to the present invention, the following shall apply:

"phosphate monomer" refers to an ethylenically unsaturated monomer of the present invention having the general formula:

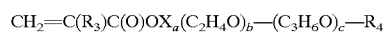

wherein a=0 or 1; when a=1, X is an akyl, aryl, or alkaryl diradical connecting group of 1–9 carbon atoms; b and c are independently selected from the range of 0–100 provided that b and c are not simultaneously 0; $R_3$ is H or $CH_3$; and $R_4$ is selected from the group consisting of $PO_3H_2$, an alcohol group or an epoxy group. The alcohol and/or epoxy group may be converted into phosphate functionalites as described herein.

"polymerized phosphate monomer" refers to a unit of a polymer including the structure:

prepared from the above described phosphate monomer.

"polymerized monomer" refers to a unit of a polymer prepared from a monomer.

DETAILED DESCRIPTION OF THE INVENTION

Copolymers of the present invention are preferably used as dispersants and may comprise one or more polymerized phosphate monomers. Aqueous dispersions, such as inks, comprising such copolymer have good dispersion stability and may be used in ink jet printers, preferably thermal ink jet printers. Inks of the present invention may be adapted to meet the requirements of a particular ink jet printer, such as to provide a balance of light stability, smear resistance, viscosity, surface tension, optical density, and pluggage resistance as desired for the particular application. The aqueous dispersion of the present invention may also be suitable for other applications such as paints or protective coatings.

Copolymer Dispersants

Copolymer dispersants of the present invention comprise one or more polymerized phosphate monomers, which are prepared from phosphate monomers having the general formula:

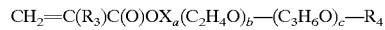

where a=0 or 1; when a=1, X is an akyl, aryl, or alkaryl diradical connecting group of 1–9 carbon atoms; b and c are independently selected from the range of 0–100 provided that b and c are not simultaneously 0; $R_3$ is H or $CH_3$; and $R_4$ is selected from the group consisting of $PO_3H_2$, an alcohol group or an epoxy group.

When $R_4$ is an alcohol group and an epoxy group, these monomers maybe phosphorylated with phosphorylating agents such as $POCl_3$, polyphophoric acid, preferably $P_{2O5}$ prior to a polymerization process. Alternatively, monomers having an $R_4$ selected from an alcohol group or an epoxy group may be incorporated into a copolymer of the present invention and then the copolymer is treated with one or more phosphorylating agents to form one or more phosphate functionalities where the epoxy group(s) or the alcohol group(s) use to be.

The polymerization of phosphate monomers creates copolymers having structures that are either random or comb. A comb structure, as used herein, refers to a copolymer of the present invention including polymerized phosphate monomers wherein b plus c are 3 or greater (i.e., the monomers stick out from the copolymer chain creating a copolymer having a comb structure). Not to be held to any particular theory, the length of phosphate monomer is thought to sterically hinder agglomeration of insoluble particles in a dispersion. A random structure, as used herein, refers to a copolymer of the present invention including polymerized monomers wherein b plus c are less than 3. Copolymers of the present invention may include from 5 weight percent to 90 weight percent, preferably 5 weight percent to 60 weight percent, most preferably 20 weight percent to 60 weight percent of polymerized phosphate monomer.

Copolymers of the present invention may be prepared from hydrophilic monomers such as ethylenically unsaturated monomers having acid or acid precursor groups. Examples of useful monomers include acrylic acid, methacrylic acid, crotonic acid, itaconic acid, itaconic acid monoester, maleic acid, maleic acid monoester, fumaric acid, fumaric acid monoester, and the like.

Copolymers of the present invention may be prepared from hydrophobic monomers such as unsaturated monomers selected from the group consisting of alkyl esters of acrylic acid, alkyl esters of methacrylic acid, aryl esters of acrylic acid, aryl esters of methacrylic acid, N-alkyl acrylamides, N-alkyl methacrylamides, N-aryl acrylamide, N-aryl methacrylamide, vinyl alkyl esters, and vinyl aryl esters. The term "alkyl" and "aryl" includes substituted alkyl, aryl, substituted alkylaryl, unsubstituted alkyl, aryl, and unsubstituted alkylaryl groups. The term "substituted" alkyl, aryl, or alkylaryl is used herein to mean an alkyl or aryl group that contains one or more substituents that do not interfere with the polymerization process. Such substituents may include alkyl, hydroxy, amino, ester, acid, acyloxy, amide, nitrile, halogen, haloalkyl, alkoxy. Examples of useful monomers include methyl acrylate, ethyl acrylate, n-butyl acrylate, 2-ethylhexyl acrylate, methyl methacrylate, ethyl methacrylate, n-butyl methacrylate, t-butyl methacrylate, 2-ethylhexyl methacrylate, cyclohexyl methacrylate, phenyl acrylate, phenyl methacrylate, benzyl acrylate, benzyl methacrylate, 2-phenylethyl acrylate, 2-phenylethyl methacrylate, 2-phenoxyethyl acrylate, 2-phenoxyethyl methacrylate, 1-naphthalyl acrylate, 2-naphthalyl acrylate, 2-naphthalyl acrylate, p-nitrophenyl acrylate, p-nitorphenyl methacrylate, phthalimidomethyl acrylate, phthalimidomethyl methacrylate, N-phenyl acrylamide, N-phenyl methacrylamide, N-benzyl acrylamide, N-benzyl methacrylamide, N-(2-phenylethyl)acrylamide, N-(2-phthalimidoethoxymethyl)acrylamide, styrene, alpha-methyl styrene, vinyl acetate, vinyl butyrate, vinyl benzoate, and the like.

Copolymers of the present invention are preferably prepared by free radical polymerization. By chance, a group of hydrophobic monomers and/or a group of hydrophilic monomers may be positioned on a polymer chain forming a hydrophobic segment and/or a hydrophilic segment, respectively. A hydrophobic segment refers to one or more hydrophobic monomers polymerized into a polymer chain to form a region of the chain that is hydrophobic in nature (it is possible that this region includes one or more hydrophilic monomers). A hydrophilic segment refers to one or more hydrophilic monomers polymerized into a polymer chain to form a region of the chain that is hydrophilic in nature (it is possible that this region includes one or more hydrophobic monomers). Not to be held to any particular theory, it is thought hydrophobic segments function, in part, to attach a polymer dispersant to an organic pigment while hydrophilic segments function, in part, to maintain dispersion stability of a pigment in a liquid.

The hydrophobic segments may also contain up to 20% by weight, based on the total weight of the polymer, monomers having functional groups to enhance the pigment binding force. For example, monomers with amine groups such as N,N-dimethylaminoethyl acrylate may be incorporated in the hydrophobic portion to bind with pigments having acidic groups on the surface. Monomers with acid groups such as 2-acrylamido-2-propane sulfonic acid may be incorporated in the hydrophobic portion for pigments with basic surfaces.

To fine tune the hydrophobicity/hydrophilicity of a copolymer and/or adjust the solubility and other physical properties (e.g., glass transition temperature) of a copolymer, a copolymer of the present invention may also be prepared from monomers of the general formula:

wherein j=0 or 1; when j=1, X is an akyl, aryl, or alkaryl diradical connecting group of 1–9 carbon atoms; k=1–50, $R_5$ is H or $CH_3$, and $R_6$ is selected from the group consisting of H and alkyl group of 1–4 carbon atoms. Examples of such monomers include 2-hydroxyethyl acrylate, 2-hydroxyethyl methacrylate, hydroxypropyl acrylate, 2-(2-methoxyethoxy) ethyl acrylate, 2-(2-methoxyethoxy)ethyl methacrylate, ethoxytriethyleneglycol methacrylate, methoxy polyethyleneglycol (molecular weight of 200–1000) monomethacrylate, polyethyleneglycol (molecular weight 200–1000) monomethacrylate.

METHODS OF MAKING COPOLYMERS

The preferred process of making a copolymer of the present invention is by free radical polymerization methods that are well known in the art. Molecular weights of copolymer used as dispersants need to be high enough to provide the required dispersion stability, but not too high to increase viscosity so that the resulting aqueous dispersion is too thick for its intended use. Molecular weights of copolymers can be easily controlled by using chain transfer agents during the polymerization process as practiced by one skilled in the art. Examples of useful chain transfer agents include the mercaptans such as n-butyl mercaptan, lauryl mercaptan, organic halides such as carbon tetrachloride, carbon tetrabromide, etc. The optimal concentration is dependent on the desired molecular weight and can be obtained through routine experimentation by one skilled in the art of polymerization. The copolymers useful for the present invention have a number averaged molecular weight of about 1,000–100,000, preferably 1,000–50,000.

Based on these known methods of polymerization, many common organic solvents are suitable for the preparation of copolymers. These include, but are not limited to, alcohols (such as methanol, ethanol, n-propanol and isopropanol);

ketones (such as acetone, butanone, pentanone and hexanone); ethers (such as tetrahydrofuran, diethyl ether, and the commonly available ethylene glycol and polyethylene glycol monoalkyl); dialkyl ethers (such as cellosolves, carbitols), alkyl esters of acetic, propionic, and butyric acids and glycols (such as ethylene glycol). Mixtures of low molecular weight alcohols such as ethanol and isopropanol and low molecular weight ketones such as acetone are particularly useful for preparing copolymers with high content of the polymerized phosphate monomers.

In some polymerization processes, one or more azo polymerization initiators may be used in the preparation of a copolymer. Examples of such initiators include 2,2'-azobis (isobutyronitrile), 2,2'-azobis(2,4-dimethylvaleronitrile), 2,2'-azobis(methylbutyronitrile), and 1,1'-azobis (cyanocyclohexane) or combinations thereof. In some polymerization processes non-azo initiators maybe used including benzoyl peroxide, lauroyl peroxide or combinations thereof.

Copolymers of the present invention, after being prepared by a polymerization process may be modified prior to use. For example, neutralizing the phosphate functionality of a copolymer may increase the solubility of a copolymer in an aqueous carrier medium. Phosphoric acid functionality is an ionizable group capable of being neutralized with a base to form an anion. The acidity of the phophoric acid functionality is characterized by pKa 1=2.12, and pKa 2=7.21. Depending on the pH of the aqueous ink, the phosphate group may be mono-valently charged or divalently charged. Copolymer of the present invention may be used as anionic dispersants within a pH range of about 3.0 to about 12.0. Examples of useful bases used to neutralize the ionizable groups include alkali metal hydroxides (such as lithium, sodium, and potassium hydroxide), alkali metal carbonate and bicarbonate (such as sodium and potassium carbonate and bicarbonate), organic amines (such as mono-, di-, tri-methylamine, morpholine, N-methylmorpholine), organic alcohol amines (N,N-dimethylethanolamine, N-methyl diethanolamine, mono-, di-, tri-ethanolamine), ammonium salts (such as ammonium hydroxide, tetra-alkyl ammonium hydroxide), pyridine and combinations thereof. The neutralization of copolymers of the present invention will most likely form salts of the ionizable groups. A copolymer dispersant of the present invention may include polymerized monomers containing ionizable groups such as carboxylic acid functionalities, for example.

INKS

Aqueous dispersions of the present invention include an inventive copolymer dispersant, a colorant, and an aqueous carrier. Inventive inks are able to inhibit color bleed by providing a large number of inks having differing pH due to the one or more ionizable phosphate groups (i.e., as described above). Inks can be positioned in inkjet printers so that upon spraying adjacent droplets form on substrates. Ink pairs are chosen so that each member has a different pH. At the point of contact between the two inks, ink may precipitate due to a change in pH. Such chemistry leads to cleaner character edges and prevents color bleed. Not to be held to any particular theory it is thought that a dot of ink sprayed onto a substrate spreads. The colorant of the ink follows the solvent front unless a mechanism is present that separates the dispersed dye and/or pigment from the solvent. Precipitation, flocculation or colorant interaction with the substrate may provide this mechanism.

Colorant

Aqueous dispersions, such as inks of the present invention, may include colorants such as dyes, dispersed dyes, or pigments. Dyes refer to colorants that are soluble during ink formation and printing. Pigments refer to colorants that are insoluble during ink formation and printing. Dispersed dyes refer to colorants that are insoluble during ink formation but become soluble some point during a printing process.

Pigments suitable for use in the practice of the present invention are sufficiently small to permit free flow of ink through an ink jet printing device, especially at ejecting nozzles that usually have a diameter ranging from 10 micron to 50 micron. Particle size also has an influence on pigment dispersion stability characteristics, which is critical throughout the life of the ink. Brownian motion of minute particles will help prevent the particles from settling. It is also desirable to use small particles for maximum color strength and gloss. The range of useful particle size is approximately 0.005 micron to 15 micron. Preferably, the pigment particle size should range from 0.005 to 5 micron and most preferably, from 0.01 to 0.3 micron. The pigment may be used in dry or wet form such as presscakes. Useful pigments for the practice of the present invention include a wide variety of organic and /or inorganic pigments, alone or in combination. In the case of organic pigments, the ink may contain up to approximately 30% pigment by weight, but will generally be in the range of approximately 1 to 15%, preferably approximately 1 to 8%, of the total weight of the ink composition for most ink jet printing applications such as thermal ink jet printing applications. If an inorganic pigment is selected, the ink will tend to contain higher weight percentages of the pigment than with comparable inks employing organic pigment, and may be as high as approximately 50 weight % because inorganic pigments generally have higher specific gravities than the organic pigments.

Fine particles of metal or metal oxides also may be used as colorants. For example, metal and metal oxides are suitable for the preparation of magnetic ink jet inks. Fine particle size oxides, such as silica, alumina, titania, and the like, also may be selected. Furthermore, finely divided metal particles, such as copper, iron, steel, aluminum and alloys, may be selected for appropriate applications. The color and amount of disperse dye used in an aqueous dispersion is primarily dependent upon the desired color of the print achieved, the purity of the dispersed dye, and the strength of the dispersed dye. Low concentrations of dispersed dye may not give adequate color vividness. High concentrations of dispersed dye may result in poor print head performance or unacceptably dark colors. The disperse dye may be present in the amount of 0.01 to 20%, by weight, preferably 0.05 to 8%, by weight, more preferably 1 to 5%, by weight, based on the total weight of the ink. Disperse dyes that may be useful in this invention are disclosed in U.S. Pat. No. 5,053,495 (Greenwood et al.), U.S. Pat. No. 5,203,912 (Greenwood et al.), and U.S. Pat. No. 5,102,448 (Greenwood et al.).

Aqueous Carriers

Aqueous carriers used to make inks of the present invention comprise water, or a mixture of water and at least one water soluble organic solvent. Deionized water is the preferred aqueous carrier when the aqueous carrier is substantially free of an organic solvent. Deionized water and a water soluble organic solvent having at least 2 hydroxyl groups, e.g., diethylene glycol is the preferred aqueous carrier when the aqueous carrier is a mixture of water and at least one water soluble organic solvent. Examples of water-miscible organic solvents suitable for use in the practice of the present invention are disclosed in U.S. Pat. No. 5,085,698 (Ma et al.). Water soluble organic solvents may be selected for purposes of modifying the surface tension and viscosity of an ink, being compatible with a selected pigment, modifying ink dry time, and being compatible with the type of media substrate onto which the ink will be printed. An aqueous carrier comprising water and a water soluble organic solvent comprises by weight percent, about 30% to about 99% of water, preferably about 60% to about 99% of water and about 1% to about 70% of water soluble organic solvent, preferably about 1% to about 30% of a water soluble organic solvent The aqueous carrier is in the range of about 70% to about 99.8% of an ink, preferably about 94% to about 99.8%,based on total weight of the ink when a dispersed dye and/or an organic pigment is selected. The aqueous carrier is in the range of about 25% to about 99.8% of an ink, preferably about 70% to about 99.8% when an inorganic pigment is selected.

Ink Additives

Various types of aqueous additives may be combined with ink formulations of the present invention to modify the properties such as viscosity. Examples of additives include, coalescing agents, polymeric binders (such as water dispersable latex emulsions), thickeners, thixotropic agents, surfactants, coating aids, biocides, sequestering agents, etc.

When the inks of the present invention are used in ink jet printers, anionic, cationic, nonionic, or amphoteric surfactants may be present in the amount of 0.01–5% and preferably 0.2–2%, based on the total weight of the ink. Examples of useful surfactants are disclosed in U.S. Pat. No. 5,221,334 (Hochberg et al.). Biocides may be added to inks of the present invention such as DOWICIDE, commercially available from Dow Chemical, of Midland, Mich.; NUOSEPT commercially available from Huls America, Inc., of Piscataway, N.J.; OMIDINES commercially available from Olin Corp. of Cheshire, Conn.; NOPCOCIDES commercially available from Henkel Corp. of Ambler, Pa., TROYSANS commercially available from Troy Chemical Corp. of Newark, N.J., sodium benzoate; or combinations thereof. Other additives such as sequestering agent (such as EDTA), humectants, and viscosity modifiers may also be added to improve various properties of the ink compositions.

METHOD OF MAKING INKS

The ink compositions of the present invention are prepared in the same manner as other ink compositions used in ink jet printers. Preferably, the pigment dispersion is prepared by premixing the selected colorant(s), the copolymer dispersant and aqueous carrier. The dispersion step may be accomplished in a horizontal mini mill, a ball mill, an attritor, or by passing the mixture through a plurality of nozzles within a liquid jet interaction chamber at a liquid pressure of at least 1000 psi to produce a uniform dispersion of the pigment particles in the aqueous carrier medium. It is generally desirable to make the pigmented ink jet ink in concentrated form, which is subsequently diluted with a suitable liquid to the appropriate concentration for use in the ink jet printing system. By dilution, the ink is adjusted to the desired viscosity, color, hue, saturation density, and print area coverage for the particular application.

Jet velocity, separation length of the droplets, drop size, and stream stability are greatly affected by the surface tension and the viscosity of the ink. Ink jet inks suitable for use with ink jet printing systems should have a surface tension in the range of about 20 dyne/centimeter to about 70 dyne/centimeter and, more preferably, in the range 30 dyne/centimeter to about 70 dyne/centimeter at 20° C. as measured by a ring method. Acceptable viscosities are no greater than 20 centipoise, and preferably in the range of about 1.0 centipoise to about 10.0 centipoise at 20° C. using a conventional viscometer. The ink has physical properties compatible with a wide range of ejecting conditions, i.e., driving voltage and pulse width for thermal ink jet printing devices, driving frequency of the piezo element for either a drop-on-demand device or a continuous device, and the shape and size of the nozzle. They may be used with a variety of ink jet printers such as continuous, piezoelectric drop-on-demand and thermal or bubble jet drop-on-demand, and are particularly adapted for use in thermal ink jet printers.

The inks have excellent storage stability for a long period and do not clog in an ink jet apparatus. Fixing the ink on the media substrate, such as paper, fabric, film, etc., can be carried out rapidly and accurately. The printed ink images have clear color tones, high density, excellent water resistance and lightfastness. Furthermore, the inks are compatible with the ink jet printing apparatus and they are essentially odorless.

Copolymers of the present invention are present in the range of approximately 0.1 to 30% by weight of the total ink composition, preferably in the range of 0.1 to 8% by weight of the total ink composition. If the amount of copolymer is too high, it tends to increase the viscosity of the ink. Dispersion stability is affected if insufficient copolymer is present.

ARTICLES

The present invention also provides articles comprising a substrate, having a first and second major outer surface. Applied to the substrate is a layer (i.e., one or more drops) of an aqueous dispersion, preferably an ink, comprising a colorant and a copolymer of the present invention. The substrate may be a piece of paper if the aqueous dispersion is printed from an ink jet printer. The substrate may be plastic, wood, metal, glass, textiles or a combination thereof, for example if the aqueous dispersion is a paint, ink or other aqueous dispersion. The aqueous ink may be applied to a substrate by spraying, brushing, dipping, or other application techniques known by one skilled in the art. The layer of aqueous dispersion may be attached to the entire surface of the substrate, attached only to the first major surface of the substrate or attached to only the second major surface of the substrate. The layer of aqueous dispersion may be a contiguous or noncontiguous layer (such as dots of ink on a piece of paper).

EXAMPLE

The examples are carried out using standard techniques, which are well known and routine to those skilled in the art, except where otherwise described in detail. All parts, percentages, ratios, etc., in the examples are by weight unless otherwise indicated. Some of the materials used to make aqueous dispersions are described in Table 1. The examples are illustrative, but do not limit the invention.

TABLE 1

| Chemical | Origin |
| --- | --- |
| 2-phenoxyethylacrylate | Sartomer Co. Inc., Exton, PA |
| methyl methacrylate | Polysciences, MC., Warrington, PA |
| ethoxytriethyleneglycol methacrylate | Rohm Tech. Inc., Malden, MA |
| n-butyl mercaptan | Aldrich Chemical Co., |

TABLE 1-continued

| Chemical | Origin |
| --- | --- |
| | Milwaukee, WI |
| 2-pyrrolidone | Aldrich Chemical Co., Milwaukee, WI |
| Methanol | Aldrich Chemical Co., Milwaukee, DE |
| 2,2'-azobis(2,2-dimethylvaleronitrile) (Vazo 52) | DuPont Co., Wilmington, DE |
| Phosphorylated polyethyleneglycol methacrylate | DuPont Co., Wilmington, DE |
| Potassium hydroxide | Aldrich Chemical Co., Milwaukee, WI. |
| Carbon black | FW 18 Black, sold by Degussa Corp., Allendale, NJ |
| N-methylpyrrolidone | Aldrich Chemical Co., Milwaukee, WI |
| Liponic EG-1 | Lipo Chemicals, Inc., Paterson, NJ |
| Zonyl FSA | DuPont Co., Wilmington, DE |
| Proxel G | DuPont Co., Wilmington, DE |

COPOLYMER DISPERSANT 1

Copolymer Dispersant 1 may be described as 5 weight percent of 2-henoxyethyl acrylate, 8.3 weight percent of methyl methacrylate, 11.7 weight percent of ethoxytriethyleneglycol methacrylate, and 30 weight percent of phosphorylated 2-hydroxyethyl methacrylate. Copolymer Dispersant 1 was prepared using the free radical polymerization method.

TABLE 2

| INGREDIENTS | WEIGHT (grams) |
| --- | --- |
| Mixture 1 | |
| 2-phenoxyethyl acrylate | 9.6 |
| methyl methacrylate | 1.6 |
| ethoxytriethyleneglycol methacrylate | 2.3 |
| phosphorylated 2-hydroxyethyl metacrylate | 6.0 |
| n-butyl mercaptan | 0.2 |
| 2-pyrrolidone | 30 |
| methanol | 30 |
| deionized water | 5.0 |
| Mixture 2 | |
| 2,2'-azobis(2,2-dimethylvaleronitrile) | 0.5 |
| Acetone | 5.0 |
| Mixture 3 | |
| 2-phenoxyethyl acrylate | 50.4 |
| methyl metacrylate | 8.4 |
| ethoxytriethyleneglycol methacrylate | 11.7 |
| phosphorylated 2-hydroxyethyl methacrylate | 30 |
| n-butyl mercaptan | 0.8 |
| acetone | 5.0 |
| Mixture 4 | |
| 2,2'-azobis(2,2-dimethylvaleronitrile) | 2.0 |
| Acetone | 20.0 |
| Mixture 5 | |
| 2,2'-azobis(2,2-dimethylvaleronitrile) | 0.5 |
| Acetone | 5.0 |
| Total | 224.8 |

Mixtures 1 through 5 as illustrated in Table 2 were used to prepare Copolymer Dispersant 1. Mixture 1 was placed into a 500 milliliter flask equipped with a thermometer, stirrer, funnels, reflux condenser, while maintaining a nitrogen blanket over Mixture 1. Mixture 1 was heated to reflux temperature, and held at this temperature for approximately 10 minutes. Mixture 2 was combined with Mixture 1 within the 500 milliliter flask. Mixtures 3 and 4 were simultaneously added to the contents of the flask over a 4 hour time period while the reflux temperature was maintained. The contents of the flask was held at the reflux temperature for an hour followed by the addition of Mixture 5 to the flask. The contents of the flask remained at the reflux temperature for an hour. The contents of the flask was distilled until about 60 grams of volatiles (condensed gas) was collected. To the 60 grams of volatiles, 102 grams of 2-pyrrolidone was added yielding 262.3 grams of a 45.9% copolymer solution.

COPOLYMER DISPERSANT 2

Copolymer Dispersant 2 can be described as 60 weight percent 2-phenoxyethyl acrylate and 40 weight percent phosphorylated polyethyleneglycol (Molecular Weight 300) methacrylate. Copolymer Dispersant 2 was prepared using the free radical polymerization method.

TABLE 3

| INGREDIENTS | WEIGHT (grams) |
| --- | --- |
| Mixture 1 | |
| 2-phenoxyethyl acrylate | 9.6 |
| phosphorylated polyethyleneglycol (MW=) methacrylate | 6.4 |
| n-butyl mercaptan | 0.2 |
| 2-pyrrolidone | 30 |
| methanol | 20 |
| deionized water | 5.0 |
| Mixture 2 | |
| 2,2'-azobis(2,2-dimethylvaleronitrile) | 0.5 |
| Acetone | 5.0 |
| Mixture 3 | |
| 2-phenoxyethyl acrylate | 50.4 |
| phosphorylated polyethyleneglycol (MW=) methacrylate | 33.6 |
| n-butyl mercaptan | 0.8 |
| acetone | 5.0 |
| Mixture 4 | |
| 2,2'-azobis(2,2-dimethylvaleronitrile) | 2.0 |
| Acetone | 20.0 |
| Mixture 5 | |
| 2,2'-azobis(2,2-dimethylvaleronitrile) | 0.5 |
| Acetone | 5.0 |
| Total | 194.0 |

Mixtures 1 through 5 as illustrated in Table 3 were used to prepare Copolymer Dispersant 2. Mixture 1 was placed into a 500 milliliter flask equipped with a thermometer, stiffer, funnels, reflux condenser, while maintaining a nitrogen blanket over the Mixture 1. Mixture 1 was heated to reflux temperature and held at this temperature for about 10 minutes. Mixture 2 was combined with Mixture 1 within the 500 milliliter flask. Mixtures 3 and 4 were simultaneously added to the contents of the flask over a four hour time period while the reflux temperature was maintained. The contents of the flask was held at the reflux temperature for an hour followed by the addition of Mixture 5 to the flask. The contents of the flask was maintained at the reflux temperature for an hour. The contents of the flask was distilled until about 52 grams of volatiles (condensed gas) was collected. To the 52 grams of volatiles, 80 grams of 2-pyrrolidone were added yielding 223.1 grams of a 45.3% copolymer solution.

COPOLYMER DISPERSANT 3

Copolymer Dispersant 3 can be described as 50 weight percent of 2 phenoxyethyl acrylate, 20 weight percent ethoxytriethyleneglycol methacrylate and 30 weight percent of phosphorylated 2-hydroxyethyl methacrylate. Copolymer Dispersant 3 was prepared using the free radical polymerization method.

TABLE 4

| INGREDIENTS | WEIGHT (grams) |
|---|---|
| Mixture 1 | |
| 2-phenoxyethyl acrylate | 9.6 |
| ethoxytriethyleneglycol methacrylate | 3.9 |
| phosphorylated 2-hydroxyethyl metacrylate | 6.0 |
| n-butyl mercaptan | 0.2 |
| 2-pyrrolidone | 30 |
| methanol | 30 |
| deionized water | 7.0 |
| Mixture 2 | |
| 2,2'-azobis(2,2-dimethylvaleronitrile) | 0.5 |
| Acetone | 5.0 |
| Mixture 3 | |
| 2-phenoxyethyl acrylate | 50.4 |
| ethoxytriethyleneglycol methacrylate | 20.1 |
| phosphorylated 2-hydroxyethyl methacrylate | 30 |
| n-butyl mercaptan | 0.8 |
| Mixture 4 | |
| 2,2'-azobis(2,2-dimethylvaleronitrile) | 2.0 |
| Acetone | 20.0 |
| Mixture 5 | |
| 2,2'-azobis(2,2-dimethylvaleronitrile) | 0.5 |
| Acetone | 5.0 |
| Total | 221.0 |

Mixtures 1 through 5 as illustrated in Table 4 were used to prepare Copolymer Dispersant 3. Mixture 1 was placed into a 500 milliliter flask equipped with a thermometer, stirrer, additional funnels, reflux condenser while maintaining a nitrogen blanket over Mixture 1. Mixture 1 was heated to a reflux temperature and held at this temperature for about 10 minutes. Mixture 2 was combined with Mixture 1 within the 500 milliliter flask. Mixtures 3 and 4 were simultaneously added to the contents of the flask over a four hour period while the reflux temperature was maintained. The contents of the flask was held at the reflux temperature for an hour followed by the addition of Mixture 5 to the flask. The contents of the flask was maintained at the reflux temperature for an hour. The contents of the flask was distilled until about 62 grams of volatiles (condensed gas) was collected. To the 62 grams of volatiles, 102 grams of 2-pyrrolidone was added yielding 264.5 grams of a 44.7% copolymer solution.

COPOLYMER DISPERSANT 4

Copolymer Dispersant 4 can be described as 55 weight percent of 2-phenoxyethyl acrylate, 20 weight percent of phosphorylated polypropyleneglycol (MW=300) methacrylate and 25 weight percent of methacrylic acid by weight. Copolymer Dispersant 4 was prepared using the free radical polymerization method.

TABLE 5

| INGREDIENTS | WEIGHT (grams) |
|---|---|
| Portion 1 | |
| 2-phenoxyethyl acrylate | 4.4 |
| phosphorylated polypropyleneglycol methacrylate (MW = 300) | 1.6 |
| methacrylic acid | 2.0 |
| n-butyl mercaptan | 0.1 |
| 2-pyrrolidone | 15 |
| acetone | 10 |
| Portion 2 | |
| 2,2'-azobis(2,2-dimethylvaleronitrile) | 0.25 |
| Acetone | 5.0 |
| Portion 3 | |
| 2-phenoxyethyl acrylate | 23.1 |
| phosphorylated polypropyleneglycol methacrylate (MW = 300) | 8.4 |
| methacrylic acid | 10.5 |
| n-butyl mercaptan | 0.65 |
| Portion 4 | |
| 2,2'-azobis(2,2-dimethylvaleronitrile) | 1.0 |
| Acetone | 15 |
| Portion 5 | |
| 2,2'-azobis(2,2-dimethylvaleronitrile) | 0.25 |
| Acetone | 5.0 |
| Total | 102.25 |

Mixture 1 through 5 as illustrated in Table 5 were used to prepare Copolymer Dispersant 4. Mixture 1 was placed into a 500 milliliter flask equipped with a thermometer, stirrer, additional funnels, reflux condenser while maintaining a nitrogen blanket over Mixture 1. Mixture 1 was heated to the reflux temperature and this temperature was maintained for about 10 minutes. Mixture 2 was combined with Mixture 1 within the 500 milliliter flask. Mixtures 3 and 4 were simultaneously added to the contents of the flask over a four hour period while the reflux temperature was maintained. The contents of the flask was held at the reflux temperature for an hour followed by the addition of Mixture 5 to the flask. The contents of the flask was maintained at the reflux temperature for an hour. The contents of the flask was distilled until about 30 grams of volatiles (condensed gas) was collected. To the 30 grams of volatiles, 40 grams of 2-pyrrolidone was added yielding 262.3 grams of a 48.5% copolymer solution.

Black Pigment Concentrate 1

A black pigment concentrate was prepared by first neutralizing Copolymer Dispersant 1 by combining 44.4 grams of Copolymer Dispersant 1, 3.0 grams of potassium hydroxide solution (45.5% in deionized water) and 152.6 grams of deionized water until a homogeneous 10% copolymer solution was obtained. The pH of the copolymer solution was 6.8.

The above copolymer solution was mixed with 32 grams of FW18 carbon black (FW18 BLACK, sold by Degussa Corp., Allendale, N.J.), 2.13 grams Proxel G, and 72.5 grams of deionized water and stirred mechanically for 1 hour. The mixture was processed with a microfluidizer (Microfluidics Corp., Waltham, Mass.) by passing it through the interaction chamber 5 times under a liquid pressure of about 10,000 psi. The resulting black pigment dispersion had a 15 weight percent pigment concentration and the average pigment particle size was 100 nanometer as determined by a BI-90 Brookhaven particle sizer, commercially available from Brookhaven Instrument Corp., Holtsville, N.Y.

Black Pigment Concentrate 2

A black pigment concentrate was prepared by first neutralizing Copolymer Dispersant 2 by combining 44.2 grams of Copolymer Dispersant 2, 0.3 gram of potassium hydroxide solution (45.5% in deionized water) and 155.5 grams of deionized water until a homogeneous 10% copolymer solution was obtained. The pH of the copolymer solution was 3.8.

The above copolymer solution was mixed 48 grams of FW18 carbon black and 72.5 gram of deionized water and stirred mechanically for 1 hour. The mixture was processed with a microfluidizer as described in Black Pigment Concentrate 1. The resulting black pigment concentrate had a 15% pigment concentration and an average pigment particle size of 124 nanometer as determined by a BI-90 Brookhaven particle sizer.

Black Pigment Concentrate 3

A black pigment concentrate was prepared by first neutralizing Copolymer Dispersant 3 by combining 44.7 grams of Copolymer Dispersant 3, 5.7 grams of potassium hydroxide solution (45.5% in deionized water) and 149.6 grams of deionized water until a homogenous 10 weight percent copolymer solution was obtained.

The above copolymer solution was mixed with 48 grams of carbon black and 72 grams of deionized water and stirred mechanically for 0.5 hour. The mixture was processed with a microfluidizer as described in Black Pigment Concentrate 1. The resulting black pigment concentrate had a 15 weight percent pigment concentration and the average pigment particle size was 105 nanometer as determined by a BI-90 Brookhaven particle sizer.

Black Pigment Concentrate 4

A black pigment concentrate was prepared by first neutralizing Copolymer Dispersant 4 by combining 41.2 grams of Copolymer Dispersant 4, 9.3 grams of potassium hydroxide solution (45.5% in deionized water) and 149.5 grams of deionized water until a homogeneous 10 weight percent copolymer solution was obtained. The pH of the copolymer solution was 9.0. The above copolymer solution was mixed with 48 grams of FW18 carbon black and 160 grams of deionized and stirred mechanically for 0.5 hour. The mixture was processed with a microfluidizer as described in Black Pigment Dispersion 1. The resulting black pigment concentrate had a 10% pigment concentration and had an average pigment particle size of 113 nanometer as determined by a BI-90 Brookhaven particle sizer.

Print Test:

Inks 1–4, for use in ink jet printers, were prepared by diluting the Black Pigment Concentrates 1–4. The weight percent of the components of the diluted ink concentrates 1 and 4 are illustrated in Table 6. The weight percent of the components of the diluted ink concentrates 2 and 3 are illustrated in Table 7.

TABLE 6

| INGREDIENTS | WEIGHT % |
| --- | --- |
| Carbon Black, FW18 | 2.75 |
| Copolymer Dispersant | 1.15[a] |
| 2-Pyrrolidone | 5.0 |
| N-Methylpyrrolidone | 2.0 |
| Liponic EG-1 | 4.25 |
| Zonyl FSA | 0.05 |
| Proxel G | 0.15 |
| Balance of deionized water | |

[a]Ink 4 had 1.38% of dispersant copolymer

TABLE 7

| INGREDIENTS | WEIGHT % |
| --- | --- |
| Carbon Black, FW18 | 3.75 |
| Dispersant | 1.56 |
| 2-Pyrrolidone | 9.0 |
| Liponic EG-1 | 5.0 |
| Balance of deionized water | |

Inks 1–3 were filled into a thermal ink jet pen and printed with a Hewlett Packard DeskJet 500C. ink jet printer (Hewlett Packard Co., Palo Alto, Calif.) on Gilbert bond paper (25% cotton, Mead Co., Dayton, Ohio). Ink 4 was filled into a thermal ink jet pen and printed with a Hewlett Packard DeskJet 1200 ink jet printer (Hewlett Packard Co., Palo Alto, Calif.) on Gilbert bond paper (25% cotton, Mead Co., Dayton, Ohio). The printer was set to print two large, filled squares having sidewalls of approximately 2 inches. All inks printed smoothly and exhibited sharp edges based on visual inspection. The optical density of the inks is illustrated in Table 8.

Particle Size Test

The determination of the insoluble particle size in an ink, provides an indication of the stability of the ink (i.e., the ability of an ink to maintain itself as a dispersion over a duration of time). The inks of the present invention w ere subjected to 4 temperature cycles, each consisting of 4 hours at −20° C. and 4 hours at 70° C. The insoluble particle size in each ink was measured prior to and after the four temperature cycles using a BI-90 Brookhaven particle sizer. The change in particle size was measured as delta nanometer (nm) and is illustrated in Table 8.

TABLE 8

| Ink | Black Pigment Concentrates | Optical Density | T-cycle (Delta nm) |
| --- | --- | --- | --- |
| 1 | 1 | 1.60 | — |
| 2 | 2 | 1.51 | 0 |
| 3 | 3 | 1.53 | 7 |
| 4 | 4 | 1.47 | — |

Inks 2 and 3 were stable after the temperature cycle test. Inks 1 and 4 were not tested.

The complete disclosures of all patents, patent applications, and publications are incorporated herein by reference as if individually incorporated. Various modifications and alterations of this invention will become apparent to those skilled in the art without departing from the scope and spirit of this invention, and it should be understood that this invention is not to be unduly limited to the illustrative embodiments set forth herein.

What is claimed is:

1. An aqueous ink jet ink comprising an aqueous carrier, a colorant and a dispersant, wherein the dispersant comprises a copolymer obtained from at least one polymerized monomer having the general structure:

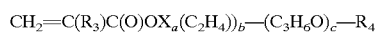

$$CH_2=C(R_3)C(O)OX_a(C_2H_4))_b-(C_3H_6O)_c-R_4$$

where a=0 or 1; when a=1, X is an akyl, aryl, or alkaryl diradical connecting group of 1–9 carbon atoms; b and c are independently selected from the range of 0–100 provided that b and c are not simultaneously 0; $R_3$ is H or $CH_3$; and $R_4$ is selected from the group consisting of $PO_3H_2$, an alcohol group and an epoxy group, provided that if $R_4$ is not $PO_3H_2$, then said copolymer has been treated with a phosphorylating agent to form one or more phosphate functionalities where the epoxy group(s) or the alcohol group(s) use to be.

2. The aqueous ink jet ink of claim 1, wherein b plus c is 3 or greater.

3. The aqueous ink jet ink of claim 1, wherein b plus c is less than 3.

4. The aqueous ink jet ink of claim 1, wherein the dispersant is also obtained from at least one polymerized monomer having the general structure:

$$CH_2=C(R_5)(C(O)OX_j(CH_2CH_2O)_k)-R_6$$

wherein j=0 or 1; when j=1, X is an akyl, aryl, or alkaryl diradical connecting group of 1–9 carbon atoms; k=1–50; $R_5$ is H or $CH_3$; and $R_6$ is selected from the group consisting of H and alkyl group of 1–4 carbon atoms.

5. The aqueous ink jet ink of claim 1, wherein the copolymer is obtained from 5 weight percent to 60 weight percent of the at least one monomer having the general structure:

$$CH_2=C(R_3)C(O)OX_a(C_2H_4O)_b-(C_3H_6O)_c-R_4.$$

6. The aqueous ink jet ink of claim 1, wherein the copolymer is obtained from at least one monomer wherein $R_4$ is $PO_3H_2$.

7. The aqueous ink jet ink of claim 1, wherein the colorant is a pigment.

8. The aqueous ink jet ink of claim 7, wherein the pigment particle size is approximately 0.005 micron to 15 microns.

9. The aqueous ink jet ink of claim 1, wherein the colorant is a dispersed dye.

10. The aqueous ink jet ink of claim 1, which has a surface tension in the range of 20 dyne/cm to 70 dyne/cm at 20° C.

11. The aqueous ink jet ink of claim 1, which has a viscosity less than 20 centipoise at 20° C.

12. The aqueous ink jet ink of claim 1, wherein the dispersant is present in the range of 0.1 to 30% by weight of the total ink composition.

13. The aqueous ink jet ink of claim 12, which has a surface tension in the range of 20 dyne/cm to 70 dyne/cm at 20° C.; wherein the colorant is a pigment; and wherein the copolymer is obtained from 5 weight percent to 60 weight percent of the at least one monomer having the general structure:

$$CH_2=C(R_3)C(O)OX_a(C_2H_4O)b-(C_3H_6O)_c-R_4.$$

14. An article comprising a substrate having a first and a second major surface and a layer of an aqueous ink jet ink, wherein the aqueous ink jet ink is as set forth in claim 1.

15. The article of claim 14, wherein the substrate is paper or textile.

* * * * *